United States Patent Office 2,967,804
Patented Jan. 10, 1961

2,967,804

METHOD OF MAKING DEXTROSE USING PURIFIED AMYLOGLUCOSIDASE

Ralph W. Kerr, Riverside, Ill., assignor to Corn Products Company, a corporation of Delaware No Drawing. Filed Dec. 30, 1957, Ser. No. 705,828

4 Claims. (Cl. 195—66)

This invention relates to a new process for hydrolyzing starch with enzymes wherein the yield of dextrose in the hydrolyzate is increased over prior art processes.

The main object of this invention is to provide an improved method for producing dextrose, or dextrose-bearing syrups, in processes involving the enzymatic hydrolysis of starch, or starch products, by means of amyloglucosidase containing preparations. The primary improvements which result are starch hydrolyzates which contain substantially less undesirable components, or impurities, that add to the burden of refining than are in starch hydrolyzates obtained by enzymatic processes of the prior art, and, in extended hydrolyses, greater potential yields of dextrose in hydrolyzates and greater actual yield of dextrose when the hydrolyzates are refined, concentrated, and crystallized, and the crystallized dextrose is separated from the mother liquors than are obtained from hydrolyzates produced by processes of the prior art. Accordingly, a more specific object of this invention is to provide a commercial process for the production of crystalline dextrose by enzymatic hydrolysis, which will give a higher yield of the sugar than is obtained from processes of the prior art. Other objects will appear hereinafter.

The existence of an enzyme which would hydrolyze starch molecules, or acid converted starch molecules, directly to the monomer, dextrose, has been recognized for at least 15 years.

As early as 1941, Kerr and Schink (Ind. Eng. Chem. 33, 1418 (1941 and later ibid. 34, 1232 (1942)) pointed out the presence of an alpha-glucosidase, in certain fungal extracts, which appeared to break away dextrose units directly from the large polysaccharide molecules in starch prehydrolyzed with acid and that there appeared to be no limit to the action short of complete hydrolysis to dextrose. Although there was disagreement with their findings, this view is now accepted.

During the interval of these early investigations, this hypothetical enzyme has been called by various names by different invetigators. It has been called alpha-glucosidase, amyloglucosidase, gluc-amylase, starch-glucogenase and maltase. The last mentioned name was used by some very early investigators on the assumption, now shown to be erroneous, that the enzyme which produces glucose directly from starch was no different from a previously known enzyme called maltase, which produces dextrose from maltose, but is substrate specific for the disaccharide. Hereinafter, this starch hydrolyzing enzyme will be referred to as amyloglucosidase.

This enzyme occurs in aqueous extracts, or culture filtrates of microorganisms, particularly the fungi. Certain strains of *A. niger*, for example, are a very good source. Naturally, other enzymes from the living cells occur in these extracts also and separation of the amyloglucosidase, even from other carbohydrases, such as the alphaamylases, transglucosidases and limit dextrinases has until recently presented an insurmountable problem. Indeed, amyloglucosidase is one of a very few remaining carbohydrases that has not as yet been separated in a form sufficiently pure to be crystallized.

In spite of the glowing predictions of some of the early workers in this field that there should be no limit to the hydrolysis of starch, short of complete hydrolysis to dextrose, and that an enzymatic dextrose process should be greatly superior to the conventional acid hydrolysis process in respect to yield of dextrose sugar and in refining problems, data from prior art processes for enzymatically produced dextrose have failed to fulfill these hopes. There have appeared to be problems in the enzymatic process analogous to the acid hydrolysis.

Process involved in the conventional acid process have been outlined by Kerr (Chemistry and Industry of Starch, second edition, Chapter XIV). There is in the acid hydrolysis process the problem of incomplete hydrolysis, due to the greater resistance of the anomalous 1–6 alpha-glucoside linkage in starch to hydrolysis. There is the synthetic action, or reversion, induced by acid whereby dextrose or lower sugars recombine into more acid stable dimers or polymers. These two results alone not only appreciably detract from the potential yield of dextrose in the hydrolyzate but, on crystallization and separation of dextrose from these hydrolyzates, they drastically reduce the actual yield of the sugar obtained (Chem. and Ind. of Starch, p. 385). When starch is hydrolyzed by fungal extracts, inspection of the hydrolyzates shows the presence of substantial quantities of dimers and polymers of dextrose with anomalous linkages, indicating either incomplete hydrolysis or synthetic action, or both.

In the acid hydrolysis process there are "destructive" reactions in which protein or nitrogenous impurities play a part. These reactions and the presence of salts add to the burden of refining the hydrolyzate and contribute to reduced yields of finished sugar. Obviously, when extraneous protein and salts are deliberately added to starch liquors by way of fungal extracts or culture filtrates, it is not surprising that these aforesaid problems in refining and further reduced dextrose yields should be aggravated in the enzymic processes of the prior art.

Several U.S. patents have been granted recently on improved processes of hydrolyzing starch with enzymes: 2,305,168, 2,531,999, 2,583,451, 2,717,852.

When enzymatic dextrose processes of the prior art are employed to hydrolyze starch or starch products, hydrolyzates are obtained which contain no more than about 85 percent dextrose, dry basis, even under optimal operating conditions. Further analysis of these hydrolyzates for total sugars, or reducing substances, as by the well known Lane and Eynon modified Fehlings test, and calculating the result as dextrose equivalent (D.E.) discloses that there is an additonal 5 percent or more of nondextrose sugars present and a balance of higher polysaccharides and noncarbohydrate impurities to total 100 percent.

When these hydrolyzates are refined by passing over bone char, filtration and concentration, and are crystallized by orthodox procedures used in the art, yields of crystalline dextrose no higher than about 60 percent, dry basis are obtained. This is substantially the same yield as is obtained in an orthodox acid conversion of starch and using comparable refining and crystallizing procedures. In both cases, the nondextrose solids present in the hydrolyzates have prevented the crystallization of some 25 to 30 percent of dextrose (calculated on a dry basis) known to be present in the hydrolyzate.

When the mother liquors from the enzymatic processes are reconcentrated and recrystallized, a yield of second grade sugar amounting to as high as 20 percent, dry basis, of the original hydrolyzates solids may be realized. Thus a total yield of sugar as high as 80 percent is obtained. When mother liquors from the acid conversion process are refined, rehydrolyzed by acid, concentrated and crystallized, also an additional yield of second grade sugar as high as 20 percent may be obtained to give a total yield of 80 percent of first and second grade sugar.

Obviously, reconversions, further refining and recrystallizations may be repeated many times to increase the yield above 80 percent in both acid and enzymatic processes but the proportionate cost increases with each repetition.

From a critical examination of the prior art, it is evident that these workers believed that the disappointingly low yield of dextrose found in starch hydrolyzates by enzymic conversion, and that actual yields of crystalline product no higher than in comparable acid hydrolysis processes, were due to one, or to a combination of two or more of the following:

(1) That the dextrose producing enzyme, per se, was incapable of carrying the conversion to any higher level; that is, that there was a "limit of conversion" analogous to the limit obtained with the maltose producing enzyme, beta-amylase.

(2) That the "limit of conversion" varied with the source of the glucosidase and that higher dextrose yields could be obtained, possibly, by finding a fungal extract with a higher "conversion limit."

(3) That the dextrose producing enzyme was a maltase substrate specific for maltose or lower polysaccharide, and accordingly, the dextrose yield from starch would depend entirely on the presence in the fungal extracts of other enzymes known to produce maltose, e.g., alpha-amylase.

(4) That because of conditions necessarily applied in practice for reasons of economy, or for some other reason, in one or more stages of the production process for making dextrose, no higher yields of dextrose could be obtained than those actually found. Such conditions contemplated were, for example, concentration of starch or starch product used for hydrolysis by the enzyme; the degree or manner in which the starch was pretreated prior to enzyme hydrolysis, as for instance, with acid; the pH, temperature and other variables of the enzymic hydrolysis and the manner in which the fermentation was carried out to produce the fungal extract.

(5) That although one function of the amyloglucosidase molecule is to hydrolyze starch to dextrose, this action was as a transferase and accordingly, this same enzyme molecule might be expected to exhibit transglucosidase activity as a secondary function, which would be anticipated to reduce the dextrose yield.

Any and all of these and similar theories are in marked contrast to the discoveries which underlie the present invention.

I have found that the amyloglucosidase molecule possesses only one function which is to hydrolyze the linkages of starch molecules so as to produce dextrose and that all other enzymes present in fungal extracts (or all other enzymic activity) may be separated from this amyloglucosidase molecule. I have found that amyloglucosidase attacks the nonreducing terminal ends of starch molecules, splits off dextrose directly from these terminals and proceeds thus along the starch molecule until it is substantially completely hydrolyzed to dextrose. Lesser yields in starch hydrolyzates obtained by use of crude fungal extracts containing the amyloglucosidase are, accordingly, due to other, interfering enzymes, including transglucosidases, which give final products other than dextrose. When starch or starch products are hydrolyzed by "purified" extracts which contain only amyloglucosidase activity and yields short of 100 percent are obtained and hydrolyzates so produced still present certain refining problems, this result is due primarily to extraneous protein and salts that are added with the "purified" extract and eventually become a part of the hydrolyzate.

Accordingly, this invention consists of an improved, practical, enzymatic process for producing dextrose in exceptionally high yield from starch and starch products, in which an amyloglucosidase containing preparation is used that has been pretreated to purify it from interfering enzymes, including, for example, transglucosidase, which act to produce sugars other than dextrose. Preferably, also, the amyloglucosidase should be purified from extraneous protein and salts which, if they become a part of the hydrolyzate liquors, add to the burden of refining these liquors to produce, finally, the pure crystalline sugar, dextrose.

My purification treatment of the enzyme consists in precipitating the enzyme from a culture liquor containing the same. It is based on the surprising discovery that the enzyme, amyloglucosidase, is soluable in pure aqueous acetone of about 50 percent by volume concentration, but is almost completely insoluble in this solvent when as little as 0.25 gram of neutral electrolyte such as sodium chloride, sodium sulphate, potassium chloride and the like are added per 100 ml. to this solvent mixture. Preferably the crude culture liquor is first treated with a small amount of Magnesol absorbent and centrifuged or the liquor may simply be centrifuged. I use between ½ ounce to about 2½ ounces of Magnesol absorbent per gallon of liquor in this preliminary clarification treatment. Clarification is carried out under acidic conditions, preferably pH 4.0 to 4.2, since the enzyme is stable under acidic conditions. (Magnesol absorbent is a water-insoluble hydrous synthetic magnesium silicate made by Westvaco Chlor-Alkali Division of Food Machinery Chemical Corporation.)

The clear centrifugate from the clarification treatment is mixed with an equal volume of acetone. There is usually sufficient electrolyte present at this point in the culture extract to provide the minimum requirement to precipitate the amyloglucosidase in 50 percent acetone. The precipitate is separated from the liquors by decantation, or other means and is washed by stirring in 50 percent aqueous acetone to which has been added 0.2 gram of sodium chloride per 100 ml. of water plus acetone. The wash is discarded.

The washed precipitate is stirred into water in order to redissolve the amyloglucosidase. A volume of water may be used equal to about one-quarter to one-half of the original volume of culture filtrate. The water mixture is centrifuged and the insoluble material discarded.

To centrifuged liquor an equal volume of acetone is added and, after stirring several minutes, the liquors are again centrifuged and any precipitate is discarded. Now, to the clear centrifugate, 0.25 gram of sodium chloride is stirred in for each 100 ml. of centrifuged liquor. The liquor is stirred and allowed to stand for the amyloglucosidase to flocculate and precipitate. The precipitate is collected, as by centrifuging, and is redissolved in a small amount of water, discarding any portion that remains insoluble. The solution of amyloglucosidase is now ready for use in the starch hydrolyzing process or it may be stored for future use, preferably, after removing traces of acetone present by distillation under reduced pressure at low temperature. Alternately, the enzyme preparation may be stored after concentrating or desiccation at lower temperature.

The amount of water used to redissolve the precipitated amyloglucosidase in carrying out the above given procedure is not critical. It will be governed by the amyloglucosidase activity of the original culture filtrate and by the amount of impurities present. If this activity is low, one does not want to form very dilute solutions of the enzyme unnecessarily since it is costly to add large volumes of acetone to reprecipitate the enzyme or it may be cumbersome to work with or store large volumes of a very dilute solution of the enzyme. On the other hand, one does not want to use such limited volumes of water so that relatively poor separations are obtained from impurities in succeeding steps or so that the amyloglucosidase does not all dissolve.

Alternately, instead of redissolving the amyloglucosidase in water, centrifuging, adding acetone and centrifuging again so as to obtain a solution of the amyloglucosidase in 50 percent aqueous acetone, the amyloglucosidase may be redissolved directly, but with longer stirring, in 50 percent aqueous acetone and centrifuging.

Alternately, also in the purification procedures, precipitation of the amyloglucosidase in aqueous acetone by the addition of trace amounts of electrolyte may be repeated additional times to secure the highest purity.

By means of the above-described purification technique, I have obtained amyloglucosidase which has been purified to the extent that when about 10 to 15 units of such amyloglucosidase per 100 grams of substrate are added to an aqueous dispersion of starch substance at pH 4.0 and 60° C., and the hydrolyzates after 72 hours are compared before and after said purification, the dextrose equivalent (D.E.) of the hydrolyzate using the purified enzyme will be increased by about 2 to about 7 percent dry basis and the dextrose content in the hydrolyzate using the purified enzyme will be increased by about 3 to about 10 percent dry basis compared to the hydrolyzate produced by the said enzyme without the purification, the conditions of hydrolysis being otherwise the same.

Amyloglucosidase activity units are determined as follows: The substrate is a 15–18 D.E. acid hydrolyzate of corn starch dissolved in water and diluted to 4.0 grams of dry substance per 100 ml. of solution. Exactly 50 ml. of the solution is pipetted into a 100-ml. volumetric flask. To the flask is added 5.0 ml. of pH 4.3, 1.0 molar sodium acetate-acetic acid buffer. The flask is placed in a water bath at 60° C., and after 10 minutes, the proper amount of enzyme preparation is added. At exactly 120 minutes after addition of the enzyme preparation, the solution is adjusted to a phenolphthalein endpoint with one normal sodium hydroxide. The solution is then cooled to room temperature, and diluted to volume. A reducing sugar value, calculated as dextrose, is determined on the diluted sample and on a control with no enzyme preparation added. Amyloglucosidase activity is calculated as follows:

$$A = \frac{S-B}{2 \times E}$$

Where:

$A$ = amyloglucosidase activity units per ml. or per gram of enzyme preparation.
$S$ = reducing sugars in enzyme converted sample, grams per 100 ml.
$B$ = reducing sugars in control, grams per 100 ml.
$E$ = amount of enzyme preparation used, ml. or grams.

The reducing sugar concentration in the enzyme-converted sample should be not more than 1.0 gram per 100 ml.

All varieties of starch, or starch products and amylaceous materials may be used in my process employing amyloglucosidase hydrolysis. Preferably, however, for dextrose sugar production, a pure starch should be used and, preferably, for economic reasons, a pure starch which is already partially hydrolyzed or converted by some means so as to reduce the very high viscosity of the native starch when it is dispersed or dissolved in water. Reduction in viscosity facilitates the use of higher solids content of starch substance in the amyloglucosidase hydrolysis. Pretreatment of the starch may be made in any number of known ways, as by preliminary acid hydrolysis, pretreatment with a purified alpha-amylase which acts very much the same as acid on starch in the initial phases of the hydrolysis, at least, or pretreatment by physical means, such as forcing the paste through a Votator machine or homogenizer. The pretreatment may be a combination of two or more procedures as, for example, acid under pressure or using an alpha-amylase treatment combined with passage through a Votator machine. In any event, the pretreatment should be suitable to reduce the viscosity of substrate to a level so that workable fluids are obtained at a solids concentration of from between 25 to 50 percent, by weight, and, preferably, at a level of about 35 percent solids when the temperature of the liquor is in the range of about 45 to 60° C. However, this pretreatment should not be extended beyond the level above indicated or otherwise any undesirable features of the hydrolysis or conversion used in the preliminary treatment may superimpose upon the results obtained in the amyloglucosidase hydrolysis which follows.

Thus, for example, in a preferred embodiment of this invention, starch is converted with very dilute acid under pressure in the orthodox manner of making a starch syrup and the syrup at about 35 percent solids concentration is hydrolyzed to dextrose with purified amyloglucosidase. When the starch is so converted in comparatively thin dispersions to the level of about 10 to 20 D.E. (dextrose equivalent), the product may be made up for amyloglucosidase hydrolysis at the preferred concentration and hydrolyzates having a dextrose content in the exceptionally high range of 90 to 98 percent, dry basis, will be obtained. However, if the acid treatment is considerably more extensive, then, even though more concentrated solutions may be used, nevertheless, the amyloglucosidase hydrolysis will not appear to have been as complete because the acid has produced a certain amount of enzyme-resistant reversion products in the more extended phases of the acid treatment.

In any event, the starch substrate should be dispersed in water and the solution should be adjusted to an acidity level and temperature should be selected so that the amyloglucosidase may complete the hydrolysis in the shortest time and with the best economy in respect to the amount of enzyme used. Acidity and temperature are interdependent variables. Soda ash, sodium hydroxide, and the like are suitable alkaline materials and hydrochloric is a suitable acid for making these adjustments of the pH level of the liquors for amyloglucosidase hydrolysis.

The optimum temperature for hydrolysis with pure amyloglucosidase is within the range of 35 to about 60° C. although the optimum temperature is dependent upon the pH as is the case with many other enzymes. Conversely, the pH optimum range, which broadly is about 4 to 6.5 is dependent upon temperature. In general, optimal rates of hydrolysis for pure amyloglucosidase will be obtained in the lower pH range of 4 to 5 when the temperature employed is in the lower range of 35 to 45° C., and as the temperature is increased, optimal rates will be obtained by increasing the pH level accordingly.

In the hydrolysis of starch or starch products with amyloglucosidase to produce dextrose, a further limitation is imposed in regard to pH level and temperature because of the lessened stability of the product, dextrose, at higher pH levels and higher temperatures. Accordingly, in carrying out the teachings of this invention, the preferred operating ranges for hydrolysis with amyloglucosidase are a pH range of 4.0 to 4.8 and a temperature range of 45 to 60° C.

The length of time for the starch hydrolysis will depend upon several operating variables. Most important of these are ratio of amyloglucosidase to substrate, pretreatment of the starch, addition of assisting enzymes, the temperature and pH levels employed and the substrate concentration. However, and in any case, the hydrolysis may be followed in practice by analytical determinations well known in the art such as, for example, the method of Sichert-Bleyer for the determination of dextrose, and the hydrolysis is continued until by analysis it is apparent that the action of the amyloglucosidase has been substantially completed under the operating conditions chosen, that is, the concentration of dextrose in the hydrolyzate has reached an optimum. In general, a practical optimum will be when the soluble solids in the hydrolyzate are found by analysis to be 90 to 98 percent dextrose on a dry basis. The length of time required to arrive at this optimum will vary between about 10 and 90 hours, depending on operating variables, such as those above discussed. A convenient operating range of purified amyloglucosidase addition is from about 10 to about 20 amyloglucosidase activity units per 100 grams of starch substrate, or about 45 to 90 units per pound of starch.

Following the hydrolysis stage of the process, the hydrolyzate is refined, concentrated, crystallized and centrifuged to recover the crystalline dextrose in pure form by use of equipment and general procedures well known in the glucose refining industry, taking into account that the hydrolyzates produced in accordance with this invention have lower concentrations of colored bodies, electrolytes and other impurities and correspondingly higher concentrations of dextrose and represent refined hydrolyzate liquors which crystallize more readily and more completely than hydrolyzates of the prior art.

The following examples which are typical and informative only will further illustrate the invention.

EXAMPLE 1

In a preferred embodiment of my invention, corn starch, which has been thoroughly washed, made up to 10° Bé. with water and adjusted to approximately 0.02 normal with hydrochloric acid is converted in an autoclave at 20 p.s.i. steam pressure until the conversion liquor is approximately 17 D.E., that is, the reducing value of the dissolved solids in the liquor, as measured by a modified Fehling's test (Fetzer, W. J., Analytical Chem. 24, 1129–1137 (1952) references Nos. 37 to 41) and the results calculated as dextrose, is 17 percent, dry basis. The liquors are then treated with 0.5 percent, dry basis, bentonite and filtered on a filter precoated with Dicalite filter aid. The liquors are adjusted to pH 4.5 and concentrated by evaporation under reduced pressure to approximately 36 percent dry substance. The liquors, adjusted to 60° C. and pH 4.5, are treated with a quantity of purified amyloglucosidase equal to 90 units per pound of dry substance starch which is sufficient so that the reducing value of the liquor as D.E. and the dextrose yield, dry basis, will reach maximal values in approximately 48 hours. These maximal values are D.E. 95 to 96 and the dextrose yield by the Sichert-Bleyer test (Sichert, K., and Bleyer, B., Z. Anal. Chem., 107, 328 (1936)) is 93 to 94 percent, dry basis. The amyloglucosidase is purified by the hereinabove given clarification and precipitating procedures for treating *A. niger* culture liquors.

The dextrose-containing liquors, now at 50 to 55° C., possess much less color, less taste, less protein and less salt content than conversion liquors from acid hydrolysis processes or enzymatic processes of the prior art for producing dextrose, but are none the less treated with 1 percent carbon, filtered, and evaporated to about 70 to 75 percent dry substance before passing to the crystallizer. Because of the higher purity of these liquors, compared to crystallizer liquors from prior art processes, the dextrose tends to crystallize much more readily, which characteristic necessitates the use of a slightly less concentrated liquor than is commonly used in orthodox dextrose crystallization procedures. An initial temperature of approximately 42° C. (108° F.) is employed in the crystallizer, with the usual addition of dextrose seed crystals, and the liquors are cooled with stirring over a period of two days to about 16 to 18° C. The liquors are then centrifuged to recover the dextrose crystals and the liquors are additionally crystallized by evaporation to about 75 to 80 percent dry substance content and stirring while cooling over a temperature range of from 42 to 18° C. during a 4-day period. Yields of very high purity, crystalline dextrose in excess of 85 percent result from this process which is at least 20 percent more dextrose than is obtained from starch by orthodox, acid conversion processes, using a single stage acid conversion and comparable refining procedures, and 5 to 10 percent or more, than is obtained in enzyme processes of the prior art.

EXAMPLE 2

In a second embodiment of my invention, well washed corn starch made up in water to a concentration of 35 percent by weight and at pH 6.5 is mixed with a relatively pure alpha-amylase preparation obtained from a thermophilic bacteria, such as for example, *B. subtilis*, passed through a Votator at about 88 to 90° C. and then held for approximately 30 minutes at about this temperature before being cooled to 60° C. The amount of alpha-amylase added is sufficient to reduce the viscosity of the gelatinized starch to a level where it is a workable fluid at 60° C. This viscosity is not critical. The acidity of the liquor is adjusted to pH 4.0 by adding hydrochloric acid and 60 units of a purified amyloglucosidase preparation is now added per pound of dry substance starch which is sufficient in amount so that by holding the starch enzyme mixture for 3 days at a temperature 55 to 60° C. a maximal D.E. is obtained in the resulting hydrolyzate liquor which is of the order of 95. The purified amyloglucosidase used is prepared from *A. niger* culture filtrates by the acetone salt precipitation method described above. The liquors are filtered and then are refined, concentrated by evaporation, crystallized and centrifuged to recover the crystalline dextrose in pure form. Purity and yields are comparable to those obtained in the first given procedure.

EXAMPLE 3

The following example is given to show: (a) that amyloglucosidase can be effectively separated from other starch modifying enzymes by the acetone-sodium chloride precipitation method previously described and (b) that an exceptionally high yield of dextrose is obtained in the hydrolysis of acid pretreated starch with this enzyme.

A culture filtrate of *A. niger* NRRL 330, high in amyloglucosidase content, was mixed with an equal volume of acetone and the precipitate which formed was collected by centrifuging and washed with 50 percent by volume aqueous acetone, containing 0.25 percent NaCl. The original centrifugate was evaporated under reduced pressure to get rid of the acetone and was saved for testing. The washed precipitate was taken up in water, centrifuged, and the centrifugate mixed with an equal volume of acetone and centrifuged again. To this centrifugate, 0.25 gram of sodium chloride was added per 100 ml. The precipitate was separated and taken up in water. The solution, containing the amyloglucosidase, was used to hydrolyze starch as follows:

Exactly two grams, dry basis, of a starch, pretreated with acid until by reducing test it showed a D.E. of approximately 10, and known commercially as Lintner "Soluble Starch," was brought to a boil in water to dissolve, then cooled and made up to a volume of 500 ml. with water which contained sodium acetate buffer to adjust the pH to 5.0. To one, 200 ml. portion at 45° C., one milliliter of the amyloglucosidase solution was added at zero time and to another 200 ml. portion, one milliliter of the original centrifugate, mentioned above was added which contained presumably alpha-amylase, glucosidases not precipitated by the acetone and salt, other starch hydrolyzing enzymes as well as transglucosidase and other carbohydrases. At time intervals shown in the table, aliquots of the hydrolyzates were removed for testing. Total reducing value was measured by ferricyanide oxidation (Gore, H. C., and Steele, H. K., Ind. Eng. Chem., Anal. Ed., 7, 324 (1935)) and the results in the table are expressed both as percent of starch hydrolyzed to dextrose and the yield of dextrose on a dry weight percentage basis. The course of hydrolysis was also followed by treating aliquots with iodine and measuring the change in starch-iodine color, if any, from blue to yellow as the hydrolysis proceeds. Color was measured by determining the minimum percent light transmission of the solution in a Coleman spectrophotometer. This general test has been fully described by Kerr et al. (Kerr, Cleveland and Katzbeck, J. Am. Chem. Soc., 73, 3916 (1951)). The significance of this starch iodine test is that it distinguishes the action of amyloglucosidase from all other known enzymes which produce reducing sugars such as dextrose in starch hydrolysis, or by combinations of enzymes, except beta-amylase which, in this case, is known to be absent. The highly unique manner by which amyloglucosidase acts is that a molecule of the enzyme attacks a molecule of starch and (by an endwise attack, splitting off only dextrose units) completely hydrolyzes that molecule before the enzyme attacks another starch molecule. Therefore, if the starch is being hydrolyzed to dextrose by amyloglucosidase, then the iodine color of the hydrolyzate will remain in the blue (about wavelength 620 to 630 m$\mu$ for whole starch) until the hydrolysis of the starch substance is very nearly complete, because amyloglucosidase completely splits each starch molecule to dextrose before the enzyme molecule attacks another starch molecule. Therefore, any starch remaining which is still unhydrolyzed, say at 50 percent hydrolysis, will give a blue color almost the same as the original sample. Whereas, if the starch were being hydrolyzed by any mechanism other than the unique manner in which amyloglucosidase acts, the action on starch by other enzymes being random, then this random action will quickly reduce the "chain length," or molecular weight, of all of the starch molecules and the blue color of the starch solution with iodine will quickly change from blue through red to yellow; that is, the color wavelength will shift rapidly from about 630 m$\mu$ to about 450 m$\mu$.

The results show that the starch hydrolyzing enzyme in the acetone-NaCl precipitate of the A. niger culture filtrate was essentially pure amyloglucosidase, since the starch was rapidly hydrolyzed to dextrose and yet, even when almost 50 percent of the dry weight of the starch sample had been hydrolyzed to dextrose, the iodine coloring molecules in the hydrolyzate gave a blue color with iodine, which was substantially the same (as measured by wavelength of minimum light transmission) as the original starch sample at the beginning of the enzymic hydrolysis. On the other hand, the fraction of the A. niger culture filtrate which did not precipitate with acetone-NaCl also hydrolyzed the acid pretreated starch to dextrose but the action here involved a random attack on nearly all starch molecules since by the time the first sample was taken (at 8.5 percent hydrolysis), there were no starch molecules left to give the characteristically blue color with iodine. This action is not characteristic of amyloglucosidase but is rather characteristic of alpha-amylases and other carbohydrases known to be present.

TABLE I

*Hydrolysis of acid-pretreated starch (Lintner soluble starch) with amyloglucosidase purified by acetone-NaCl precipitation*

| Hydrolysis Time at 45° C., Min. | Hydrolysis With the Acetone-NaCl Precipitate (Amyloglucosidase) | | | Hydrolysis With the A. niger Culture Filtrate Centrifugate | | |
|---|---|---|---|---|---|---|
| | Percentage of Starch Hydrolyzed to Dextrose | Dry Basis Yield of Dextrose | I-Color Wavelength, m$\mu$ | Percentage of Starch Hydrolyzed to Dextrose | Dry Basis Yield of Dextrose | I-Color Wavelength, m$\mu$ |
| 0 | 0 | 0 | 635 | 0 | 0 | 635 |
| 15 | 12.6 | 14.0 | 635 | 8.45 | 9.4 | 555 |
| 45 | 32.0 | 35.6 | 630 | 24.8 | 27.6 | 465 |
| 120 | 48.5 | 53.9 | 620 | 57.0 | 63.4 | 450 |
| 1,440 | 96.5 | 107.1 | 450 | 92.1 | 102.2 | 450 |

Using the procedures of Corman and Langlykke (Corman, J., and Langlykke, A. F., Cereal Chem., 25, 190 (1948)) wherein amyloglucosidase activity is measured by the hydrolysis of maltose, it was determined that about 64 percent of the amyloglucosidase in the original culture filtrate was recovered in the acetone-NaCl precipitation method used to effect purification.

The results in the table show, secondly, that the purified amyloglucosidase hydrolyzed the acid pretreated starch to dextrose to the exceptionally high level of 96.5 percent. This corresponds to a yield of 107.1 percent dry basis dextrose based on dry basis starch. It is to be recalled that the theoretical maximum yield of dextrose from starch, dry basis, is 111.1 percent due to a chemical gain of one molecular weight of water (mol. wt.=18) for each anhydroglucopyranose unit (mol. wt.=162) in the starch molecule.

EXAMPLE 4

The following example is given to show how amyloglucosidase may be prepared free from other carbohydrase activity by the differential inactivation method with acid, referred to above, and to demonstrate the exceptionally high yields of dextrose which may be obtained when this purified amyloglucosidase preparation is used in hydrolysis of starch.

A culture filtrate of A. niger NRRL-330 No. 1, received from the Northern Regional Research Laboratory, was cooled to 5° C. and sufficient hydrochloric acid was cautiously added with vigorous stirring, sufficient to maintain a pH value of between 2.25 and 2.75 when the solution was stored for 7 days in a refrigerator at about 5° C. At the end of this storage time, cold sodium hydroxide solution was added dropwise with very vigorous agitation until the pH level was approximately 4.8. The liquor was centrifuged to remove a brownish sludge of proteinaceous material which had become insolubilized during the treatment. The clarified solution was tested to show that it contained active amyloglucosidase substantially free of alpha-amylase and like impurities by inspection of iodine colors during hydrolysis in a manner similar to that used in the preceding example. A solution of corn amylose was made by dissolving 2.5 grams in 615 ml. of water and adjusting to pH 5.0 and a temperature of 45° C. To one portion an aliquot of the acid treated culture filtrate was added and to another portion an aliquot of the original *A. niger* culture filtrate was added. Samples were removed at various time intervals and stained with iodine. Colors were examined for wavelength of minimum percent light transmission using a spectrophotometer. Percent hydrolysis to dextrose was determined in both cases. In the hydrolysis using the acid treated culture filtrate, even at 47 percent hydrolysis to dextrose, the iodine stained hydrolyzate gave a blue color with a minimum transmission wavelength substantially the same as the original substrate, 640 m$\mu$ whereas the hydrolyzate containing the original culture filtrate at 44 percent hydrolysis to dextrose gave a color towards the red of 550 m$\mu$ for minimum percent light transmission. Obviously, the action of the acid treated culture filtrate was characteristically that of relatively pure amyloglucosidase.

Acid treated *A. niger* culture filtrate was used in additional hydrolysis studies.

Crystalline amylose (Kerr, R. W., and Severson, G. M., J. Am. Chem. Soc., 65, 193 (1943)) a water soluble fraction of corn starch prepared by heating the starch in water and precipitation with butanol, was made up for enzymic hydrolysis by dissolving exactly 600 mg., dry basis, in about 300 ml. of hot water, adjusting to pH 5.0 and 45° C., adding an aliquot of the purified amyloglucosidase preparation described directly above and adjusting the total volume to exactly 312.5 ml. The hydrolysis was held at 45° C. and samples were removed for analysis at time intervals shown in the table. Also shown in the table are the actual dextrose content of the hydrolysis liquors, dry basis, as determined by the Sichert-Bleyer method as well as the D.E., that is, the dextrose equivalent of all reducing substances present.

*Hydrolysis with amyloglucosidase prepared by differential inactivation of culture filtrates with acid*

| Hydrolysis Time, Min. | Percentage Composition of Hydrolyzate Dry Basis as D.E.[a] | Actual Dextrose[b] Content of Hydrolyzate Dry Basis, as Percent | Calculated Yield[c] of Dextrose From Dry Substrate, Percent |
| --- | --- | --- | --- |
| 60 | 8.3 | 7.8 | 8.61 |
| 120 | 16.8 | 17.3 | 19.3 |
| 195 | 27.7 | 29.5 | 32.8 |
| 270 | 39.4 | 35.6 | 39.5 |
| 1,260 | 99.5 | 97.8 | 108.7 |

[a] Dextrose equivalent of reducing substances.
[b] By Sichert-Bleyer method.
[c] Theoretical maximum is 111.1 percent; based on true dextrose values by Sichert-Bleyer test.

The exceptionally high percentage of dextrose formed by hydrolysis and the close agreement between total reducing substances present, calculated as dextrose (D.E.), and the dextrose actually found by analysis, as percent dry substance in the hydrolyzate, clearly show that the dextrose producing enzyme, amyloglucosidase, has been substantially freed of all other interfering enzymes which would have produced sugars other than dextrose.

In order to confirm this result, a sample of the final hydrolyzate was analyzed additionally by paper chromatography. A mixture of butanol (6 parts), pyridine (4 parts) and water (3 parts) was used as solvent to develop the strips of paper and alkaline 3,5 dinitrosalicylic acid was used to spray the paper strip in order to locate sugar spots on the strip. Under conditions which pure dextrose gave an average $R_F$ value of approximately 0.30, only one sugar spot could be detected on strips used to analyze the hydrolyzate and this had an average $R_F$ value of 0.31. For comparison, even the disaccharide, maltose, when tested by this procedure gave a spot which was far removed from the above noted locality, the $R_F$ value being 0.24. Therefore, since only one sugar, dextrose, was observed in the hydrolyzate using amyloglucosidase (the remaining small reducing value being far less converted starch substance), it follows that other interfering enzymes, such as alpha-amylase which produces also maltose and its homologues, and transglucosidase which produces the trisaccharide, panose, and its homologues, could not have been present in any significant amounts.

EXAMPLE 5

The following example is given to show the lesser refining necessary for hydrolyzates from my process than for hydrolyzates of prior art processes and the use of my invention to produce at low cost a dextrose containing syrup suitable even for food uses.

The procedures given in Example 2 were repeated with the exception that the amyloglucosidase hydrolysis was terminated when the D.E. approached the level of 60. This was accomplished by use of a lesser quantity of enzyme than used when hydrolyzing to 90 D.E. and above and by heating the hydrolyzate. The liquors were filtered with a small amount of filter aid, concentrated by evaporation to a thickened syrup and bottled. The syrup so produced with substantially no refining whatsoever was of a bland, sweet taste with no objectionable odor and very light in color, whereas in prior art processes starch syrups, to be edible, are subjected to several additional refining operations, such as carbon treatment or passing over bone char filters, both before and after the final evaporation step, in order to reduce or remove color, or color forming impurities, and unpleasant or objectionable tastes and odors.

EXAMPLE 6

The following example is given to show the very great improvement in color and purity of starch hydrolyzates when acetone precipitation, with controlled electrolyte concentration, is used alone in purification of amyloglucosidase in crude fungal extracts.

A sample of crude *A. niger* culture liquor was added to an aqueous solution of corn syrup at a solids concentration of 35 percent by weight and pH 4.0. The corn syrup was prepared by acid conversion of corn starch under pressure to a D.E. level of 17 percent dry basis. This enzymatic hydrolysis was allowed to proceed for 72 hours at 60° C. The liquors were then filtered and analyzed. The optical density of the hydrolyzate liquor at pH 4.0 was 0.208, at a wavelength of $\lambda=390$ m$\mu$ using a Coleman Model 14 spectrophotometer. The dry substance was 35.6 percent by weight. The D.E. was 90.2 percent, dry basis, by the Lane-Eynon modified Fehling's test and the actual dextrose content was 84.0 percent, dry basis, by the Smogyi yeast fermentation method.

An aliquot of a purified amyloglocosidase which had been prepared from the same crude *A. niger* culture liquor, directly by precipitation with acetone addition to 50 percent by volume concentration, and in the presence of 0.25 gram NaCl per 100 ml., was added to another portion of the same corn syrup solution as used above and hydrolysis was allowed to proceed at pH 4.0 and 60° C. After 72 hours the filtered hydrolyzate at pH 4.0 had an optical density of only 0.111 when measured in a Coleman Model 14 spectrophotometer at a wavelength of $\lambda=390$ m$\mu$. The concentration was 35.11 percent solids by weight. The D.E. was found to be 92.5 percent, dry basis, and the actual dextrose content 87.2 percent, dry basis. Therefore, the color of the starch hydrolyzate liquor is approximately double when untreated fungal extracts are used for hydrolysis compared to the very light colors when purified amyloglucosidase is used and there is a gain of over 3 percent actual dextrose in hydrolyzates in the latter case.

I claim:

1. In a process for producing dextrose from starch wherein the starch in aqueous system is hydrolyzed with an amyloglucosidase containing enzyme preparation to maximal D.E. and true dextrose contents, the hydrolyzate is clarified, concentrated by evaporation, and allowed to crystallize, and the crystallized dextrose is separated from the mother liquor, the improvement with consists in hydrolyzing the starch with an amyloglucosidase containing enzyme preparation which has been purified by adding to a 50 percent by volume aqueous acetone solution of said preparation about 0.25 gram of electrolyte per 100 ml. of acetone solution to precipitate the amyloglucosidase, separating and washing the amyloglucosidase, redissolving the amyloglucosidase in 50 percent by volume aqueous acetone, adding 0.25 gram of electrolyte per 100 ml. of solution to precipitate the amyloglucosidase and separating the precipitated purified amyloglucosidase; said hydrolysis resulting in a final hydrolyzate which has maximal D.E. values of about 93 to 96 percent and maximal true dextrose contents of about 87 to 94 percent, dry basis.

2. Process according to claim 1 wherein said enzyme preparation in aqueous solution is treated with about 0.5 to about 2 percent of a water insoluble hydrous synthetic magnesium silicate, at a pH of about 3.8 to about 4.5, the mixture centrifuged and the liquid phase containing amyloglucosidase is subjected to said treatment with acetone and salt.

3. A process for obtaining pure amyloglucosidase from an amyloglucosidase containing enzyme preparation which comprises treating an aqueous solution of said preparation about 0.5 to about 2 percent of a water insoluble hydrous synthetic magnesium silicate, at a pH of about 3.8 to about 4.5, centrifuging the mixture, adding to the liquid phase containing the amyloglucosidase sufficient acetone to provide a 50 percent by volume acetone solution, adding thereto about 0.25 gram of electrolyte per 100 ml. of acetone solution to precipitate the amyloglucosidase, separating and washing the amyloglucosidase, redissolving the amyloglucosidase in 50 percent by volume aqueous acetone, adding about 0.25 gram of electrolyte per 100 ml. of solution to precipitate the amyloglucosidase and separating the purified amyloglucosidase.

4. A process for treating amyloglucosidase containing enzyme preparations to obtain therefrom pure amyloglucosidase which comprises adding to a 50 percent by volume aqueous acetone solution of said preparation about 0.25 gram of electrolyte per 100 ml. of acetone solution, to precipitate the amyloglucosidase, separating and washing the amyloglucosidase, redissolving the amyloglucosidase in 50 percent by volume aqueous acetone, adding 0.25 gram of electrolyte per 100 ml. of solution to precipitate the amyloglucosidase and separating the precipitated purified amyloglucosidase.

References Cited in the file of this patent

UNITED STATES PATENTS

| | | |
|---|---|---|
| 1,929,003 | Neugebauer | Oct. 3, 1933 |
| 2,121,459 | Leitz et al. | June 21, 1938 |
| 2,695,863 | Tetrault et al. | Nov. 30, 1954 |
| 2,717,852 | Stone | Sept. 13, 1955 |
| 2,810,677 | Gilkison et al. | Oct. 22, 1957 |
| 2,881,115 | Liggett et al. | Apr. 7, 1959 |
| 2,893,921 | Langlois et al. | July 7, 1959 |

OTHER REFERENCES

Cereal Chemistry, March 1949, pp. 98–109.

"The Enzymes," by Sumner et al., Academic Press Inc., New York (1950), volume 1, part 1, page 702.